(No Model.)

W. SCOTT.
WASTE PIPE CONNECTION.

No. 408,897. Patented Aug. 13, 1889.

WITNESSES.
Edward Hamilton
Geo. C. Bent

INVENTOR.
William Scott
by his Attorneys
Brown Bros.

N. PETERS, Photo-Lithographer, Washington, D. C.

UNITED STATES PATENT OFFICE.

WILLIAM SCOTT, OF MEDFORD, MASSACHUSETTS.

WASTE-PIPE CONNECTION.

SPECIFICATION forming part of Letters Patent No. 408,897, dated August 13, 1889.

Application filed April 22, 1889. Serial No. 308,183. (No model.)

*To all whom it may concern:*

Be it known that I, WILLIAM SCOTT, a citizen of the United States of America, and a resident of the town of Medford, county of Middlesex, and State of Massachusetts, have invented certain new and useful Improvements in Waste-Pipe Connections for Water-Closet and Urinal Bowls, of which the following is a full, clear, and exact description.

The improvements of this invention consist, first, in a connection for the discharge-passage of an earthenware water-closet bowl and the metal waste-pipe which is in continuation of said discharge, consisting in entering the end of the water-pipe into the discharge-passage relatively sized to leave a water-space between them and about the so-entered end portion of the water-pipe that, at the upper end of the water-pipe, is open to the discharge-passage, in combination with a flange integral with the bowl, a metal flange surrounding the waste-pipe and lying against the bowl-flange, and the joint packed with putty or other such like material, and said water-space about the water-pipe and within the discharge-passage at its lower end closed to the escape of its contained water, and means—such as headed screw bolts and nuts—securing said flanges together, and thus the water-pipe to the bowl and in its proper position, all substantially as hereinafter described; second, in a connection for the discharge-passage of an earthenware water-closet bowl and the metal waste-pipe which is in continuation of said discharge, composed of a flange integral with the bowl and of a metal flange surrounding the waste-pipe and lying against the bowl-flange, and both flanges having slots—in one running in a circular and in the other in a radial direction relative to their axial lines—in combination with headed screw-bolts which are inserted in said slots and have their heads engaged with the slots of the metal flange, so as thereby to be held against turning, but yet free to be moved along said slots, and screw-nuts which are applied to said bolts to fasten the flanges together, and thus to secure the waste-pipe to the bowl and in its proper position, and all otherwise as hereinafter described.

Figure 1:
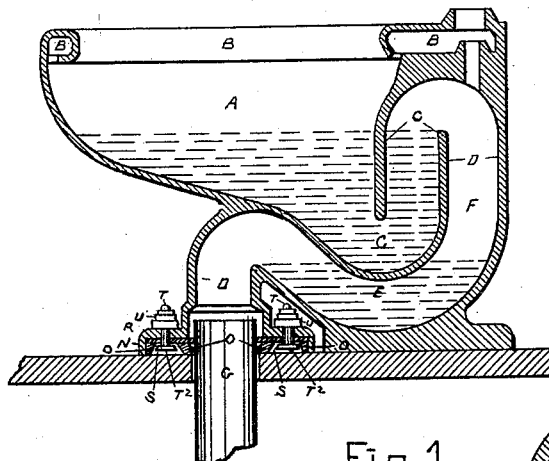
Figure 3:
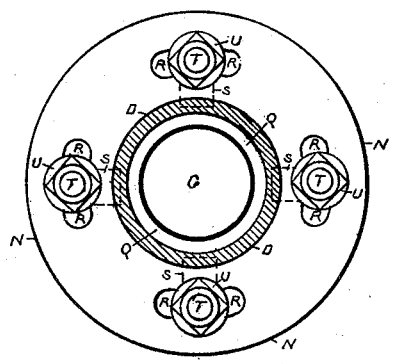
Figure 2:
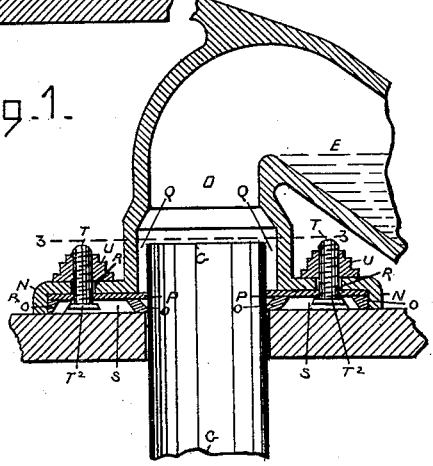
Figure 5:
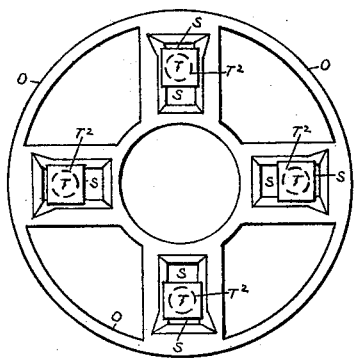
Figure 4:
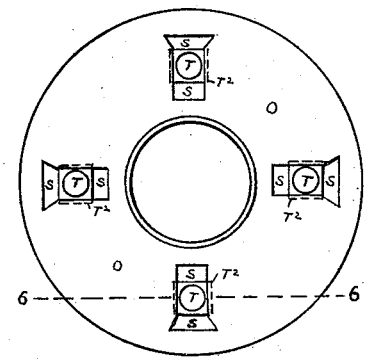
Figure 6:
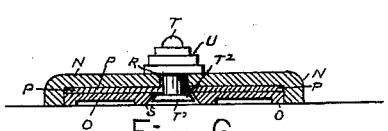

In the drawings forming part of this specification, Figure 1 is a central vertical section of a water-closet bowl having a connection of its discharge-passage and the waste-pipe in accordance with this invention. Fig. 2 is a horizontal section enlarged and in detail, line 2 2, Fig. 1. Fig. 3 is a vertical section in detail, line 3 3, Fig. 2. Figs. 4 and 5 are plan views of the metal flange with the screw-bolts inserted, and, respectively, of the upper and under sides of the flange. Fig. 6 is a cross-section, line 6 6, Fig. 4.

In the drawings, A is a water-closet bowl, which has a flushing-rim B, a water-trap C, a discharge-passage D, a water-trap E in passage D, a column F of air between traps C E, and a waste-pipe G, (shown as broken off,) in continuation of the discharge-passage D of the bowl A.

The bowl A, as described and shown, forms the subject-matter of a separate application for Letters Patent of the United States, Serial No. 291,604.

The discharge-passage D of an earthenware water-closet bowl has a flange N, which is integral with it, and which makes one part of the connection for bowl with the metal waste-pipe G, in continuation of the discharge D. O is a metal flange or ring surrounding and suitably attached, as well known, to the waste-pipe G, and opposite to the under face of the bowl-flange N and between the two flanges is a packing P, of putty or other such like material. The waste-pipe G is entered into the discharge-passage D, which is of larger diameter than the external diameter of the pipe, so as to leave an annular space Q between the two and about the waste-pipe. This space Q at its upper end is open to the water-way of the passage D, and at its lower end it is closed by the packing P between the flanges N O. Each flange N O has a series of slots R S through its thickness and located at corresponding and given distances apart and about their axial lines. Each slot R of one series runs in a circular and each slot S of the other series runs in a radial direction as to the flange-centers. Each radial slot S, Fig. 6, is wider at the lower than at the upper side of the metal flange, and its parallel edges downwardly and outwardly flare or bevel.

T T are screw-bolts, and each has a squaresided head T². Each set of slots R S receives a screw-bolt T, which passes through them, and has its head T² in and engaged with the parallel side edges of the slot S of the metal flange, and thus the bolt is held against turning while receiving a screw-nut U, and yet it is free to be moved lengthwise of the slot S. Turning the several screw-nuts up and bringing them to a firm and close bearing against the bowl-flange N fastens the flanges N O together, and with the joint between the flanges packed with putty, as stated, the connection of bowl and waste-pipe is completed.

As shown, the circular running slots R are in the bowl-flange N and the radial slots S are in the metal flange O, but they may be reversed in position, and when so reversed then the parallel edges of the circular running slots R are to be shaped as, for illustration, described for the radial slots S, for the heads of the screw-bolts to engage them.

Irregularities in the positions of either series of the curving and radial slots R S in no way interfere with the insertion of the bolts, thus obviating special fitting and adaptation of them to each other—obviously important advantages.

The space Q between the waste-pipe G and discharge-passage D of the bowl, and within the latter, forms a receptacle for the entrance of the putty-packing of the flange-connection and for the deposit and constant retention of water, whereby the packed joint between the flanges of the waste-pipe and bowl is water-sealed and the escape of obnoxious gases thereat thus prevented.

The improvements of this invention, as is obvious, are applicable to urinal bowls.

Having thus described my invention, what I claim, and desire to secure by Letters Patent, is—

1. A connection for the discharge-passage of an earthenware water-closet bowl and a water-pipe in continuation of said passage, composed of a flange N, about and integral with said discharge-passage, and a metal flange O, jointed and packed to said bowl-flange N, in combination with a waste-pipe G, surrounded and attached to said metal flange O and of a less diameter than and entered into the discharge-passage of the bowl, and having a space Q about it at its upper end open to the discharge-passage and at its lower end closed by the joint of said flanges, and means applied to said flanges for fastening them together, substantially as described, for the purpose specified.

2. A connection for the discharge-passage of an earthenware water-closet bowl and a waste-pipe in continuation of said passage, composed of a flange N, surrounding said discharge-passage, and a metal flange O, jointed and packed to said bowl-flange N and respectively having curved and radial slots R S, in combination with a waste-pipe G, surrounded by and attached to said metal flange O, and headed screw-bolts inserted in said slots and engaged with and held against turning by, but free to be moved lengthwise of, the slots of one of the flanges, and screw-nuts applied to said bolts, substantially as described, for the purpose specified.

In testimony whereof I have hereunto set my hand in the presence of two subscribing witnesses.

WILLIAM SCOTT.

Witnesses:
  ALBERT W. BROWN,
  FRANCES M. BROWN.